United States Patent [19]

Sewell et al.

[11] Patent Number: 5,531,801
[45] Date of Patent: Jul. 2, 1996

[54] LIQUID SPRAY AIR PURIFICATION AND CONTROLLED HUMIDIFICATION APPARATUS WITH AIR QUALITY MONITOR AND CONTROLLER

[76] Inventors: Frederic D. Sewell, 9644 Rocky Branch Dr., Dallas, Tex. 75243; Barry D. Jones, 14 Flourite Ct., Little Rock, Ark. 72212

[21] Appl. No.: 535,740

[22] Filed: Sep. 28, 1995

Related U.S. Application Data

[63] Continuation-in-part of Ser. No. 368,845, Jan. 5, 1995, which is a continuation-in-part of Ser. No. 192,988, Feb. 8, 1994, Pat. No. 5,389,120.

[51] Int. Cl.$^6$ .................................................. B01D 47/06
[52] U.S. Cl. ...................... 55/223; 55/228; 55/233; 55/242; 55/257.7; 55/274; 95/8; 95/10; 95/14
[58] Field of Search .................................. 95/14, 17, 20, 95/25, 212, 281, 8, 10, 11, 12; 55/210, 270, 223, 274, 228, 229, 233, 242, 268, 269, 418, 419, 257.2, 257.7; 364/502

[56] References Cited

U.S. PATENT DOCUMENTS

| | | | |
|---|---|---|---|
| Re. 18,328 | 1/1932 | Fedeler | 95/281 X |
| 813,217 | 2/1906 | Kinealy | 55/257.2 |
| 1,042,864 | 10/1912 | Winks | 55/223 X |
| 1,514,835 | 11/1924 | Darrah | 55/223 X |
| 2,057,579 | 10/1936 | Kurth | 55/223 |
| 2,233,976 | 3/1941 | Essick | 261/90 |
| 2,802,543 | 8/1957 | Clark | 55/242 X |
| 3,006,436 | 10/1961 | Starbuck et al. | 55/257.1 X |
| 3,522,000 | 7/1970 | Kinney | 55/223 X |
| 3,608,274 | 9/1971 | Stingelin et al. | 55/220 X |
| 3,701,235 | 10/1972 | Isaacson | 55/220 X |
| 3,731,459 | 5/1973 | Foster | 55/223 X |
| 4,323,373 | 4/1982 | Fritz | 95/281 |
| 4,484,937 | 11/1984 | James et al. | 55/223 |
| 4,676,811 | 6/1987 | Wade | 55/223 |
| 4,731,100 | 3/1988 | Loeffelmann et al. | 55/242 X |
| 4,954,148 | 9/1990 | Alexander, Sr. | 55/223 |
| 5,389,120 | 2/1995 | Sewell et al. | 55/223 |

*Primary Examiner*—Richard L. Chiesa
*Attorney, Agent, or Firm*—Konneker & Bush

[57] ABSTRACT

A water spray-based air purification system having a humidification portion and a dehumidifying portion is operatively installed in an air handling unit used to recirculate air within a conditioned space. A blower within the air handling unit housing operates to draw return air into the housing, flow the air across the entire air purification system, and then discharge the purified and humidified air back into the conditioned space. A water spray portion of the purification system is served by a pump forcing water from a sump structure through a filter, with the spray water draining back into the sump after cleansing air traversing the purification system. Upon a sensed demand therefor, an additive injector adds suitable chemical treatment material to the sump water, and a water pollutant monitor structure operates to backwash the filter upon sensing an undesirable pump back pressure increase or a buildup of particulate and gaseous pollutants in the sump water. The operation of the air handling unit and its associated air purification system are automatically monitored and regulated by a programmable air quality and monitoring and control system which is coupled to multi-parameter sensing apparatus that continually detects temperature, humidity and gaseous and particulate pollution levels present in the conditioned space or the air being delivered thereto from the air handling unit.

27 Claims, 7 Drawing Sheets

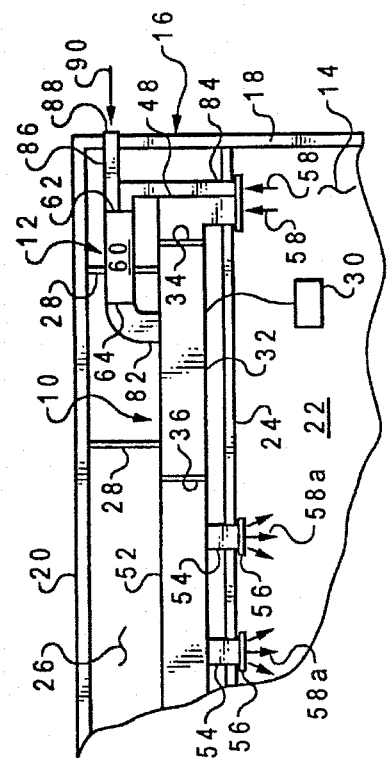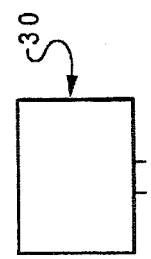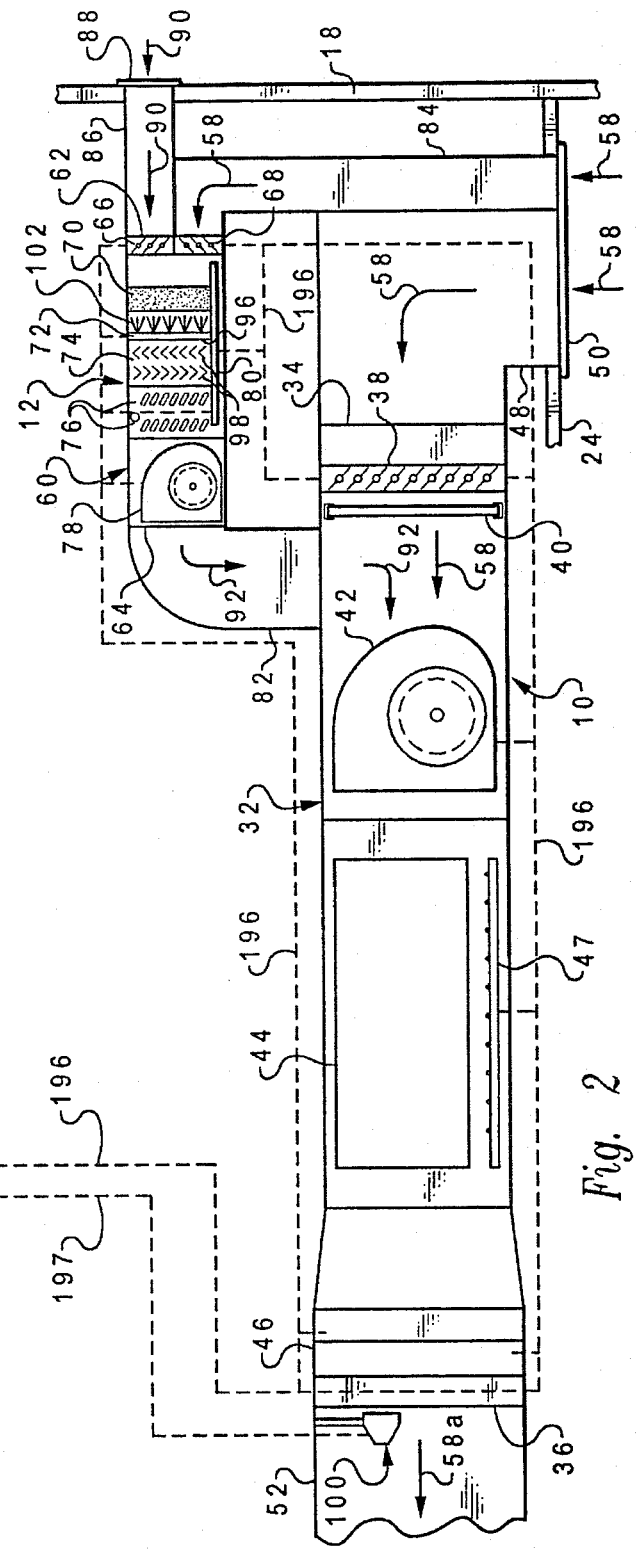
Fig. 1
Fig. 2

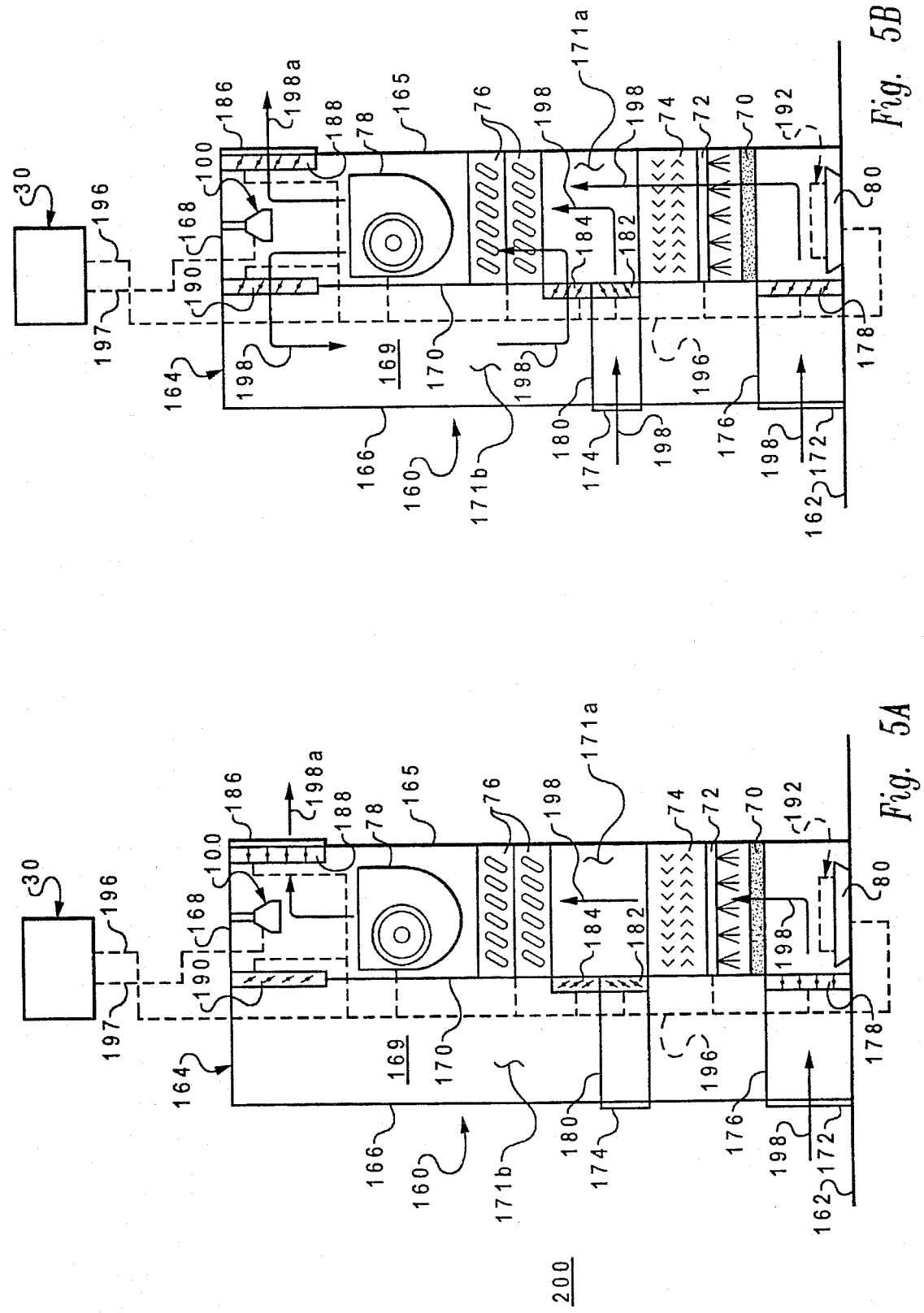

LIQUID SPRAY AIR PURIFICATION AND CONTROLLED HUMIDIFICATION APPARATUS WITH AIR QUALITY MONITOR AND CONTROLLER

CROSS-REFERENCE TO RELATED APPLICATIONS

This application is a continuation-in-part of copending U.S. application Ser. No. 08/368,845 filed on Jan. 5, 1995, entitled "LIQUID SPRAY AIR PURIFICATION AND CONTROLLED HUMIDIFICATION APPARATUS" which, in turn, was a continuation-in-part of U.S. application Ser. No. 08/192,988 filed on Feb. 8, 1994, entitled "HEATING, VENTILATION AND AIR CONDITIONING UNIT WITH AUTOMATICALLY CONTROLLED WATER SPRAY AIR PURIFICATION SYSTEM", now U.S. Pat. No. 5,389,120.

BACKGROUND OF THE INVENTION

The present invention generally relates to environmental control apparatus and, in a preferred embodiment thereof, more particularly relates to an improved liquid spray air purification and controlled humidification system which is automatically operated by a specially designed air quality monitor and controller embodying principles of the present invention.

Interior spaces of homes and other buildings are typically provided with automatically controlled temperatures using one or more air handling units that provide a recirculating flow of air drawn out of the conditioned space, flowed through the air handling unit by an air blower therein, heated or cooled as necessary within the unit, and then flowed back into the conditioned space. In addition to providing the desired temperature control within the conditioned space, air handling units of this general type are also often provided with the capability of purifying, at least to some extent, air flowing through the units.

The most common device used for this air purification task is the familiar replaceable flow-through air filter element that is disposed within the unit cabinet structure in the path of air being forced therethrough on its way back to the conditioned space served by the unit. Filters of this type are typically formed from a matted fibrous material (such as fiberglass) that serves to trap particulate matter, such as dust, borne in the conditioned space return air entering the unit. Additionally, electrostatic air filters are often incorporated in air handling units and provide improved particulate removal performance due to their electrostatic attraction and trapping of particulates substantially smaller than the ordinary fibrous filter can effectively capture.

However, as is well known, undesirable air pollutants are present in a variety of forms other than the relatively easy to capture particulates that the fibrous and electrostatic filter structures are designed to remove from the recirculated air from the conditioned space. Another known type of air purification process is the use of a liquid spray, typically a water spray, directed against filter element through which air to be supplied to a conditioned space is flowed. The liquid spray is maintained in continuous contact with the flowing air traversing the filter element, and, depending on the type of air purification system in which it is incorporated, serves to entrain a variety of airborne particulates as well as other types of pollutants such as aerosols, nitrogen oxides, sulfur oxides, carbon dioxides and monoxides, hydrogen sulfides and hydrocarbons, and then be drained away carrying entrained pollutants with it. This general type of air purification system also desirably serves to humidify the air delivered to the conditioned space.

Despite the pollution removing effectiveness of various known types of liquid spray air purification systems, their use has typically been limited to industrial and commercial applications, as opposed to residential applications, due to reasons such as excessive humidity and lack of humidity control, complexity, cost and increased maintenance requirements compared to dry filtering systems. Because of the increased awareness of air polluting materials, and the desirability of removing them from residential environments, it is seen as desirable to provide a liquid spray air purification system that is suitable for incorporation in residential as well as commercial applications. It is accordingly an object of the present invention to provide such a system which will (1) both purify the air and control the humidity of the air delivered to a conditioned space and (2) automatically monitor the air quality and control the operation of the system to economically clean the air and maintain the air quality, temperature, and humidity within desired, selectively variable preset ranges.

SUMMARY OF THE INVENTION

In carrying out principles of the present invention, in accordance with a preferred embodiment thereof, an air handling unit is provided that includes a housing having an inlet opening, an outlet opening, and an internal flow path extending between the inlet opening and the outlet opening, and blower means for sequentially flowing air inwardly through the inlet opening, through the internal flow path, and outwardly through the outlet opening. The air handling unit is representatively illustrated in both HVAC unit and air purification and controlled humidification unit embodiments.

Air purification means are disposed in the internal housing flow path, and are operative to receive pressurized liquid from a source thereof, create a spray from the received liquid, use the spray to purify air traversing the internal housing flow path, and then permit the sprayed liquid to drain therefrom into sump means operative to hold a supply of liquid to be operatively supplied to the air purification means and receive liquid draining therefrom.

The air handling unit further comprises filter means having therein a filtering flow path through which liquid may be forced to trap pollutants in the filter means, and a backwashing flow path through which liquid may be forced to cleanse the filter means of trapped pollutants. A pump portion of the air handling unit has an inlet communicatable with liquid in the sump means, and an outlet. Conduit means interconnect the pump outlet with the filtering flow path and the backwashing flow path, and also interconnect the filtering flow path with the air purification means.

Switching means are associated with the conduit means and are selectively operative in a first mode to cause sump liquid discharged from the pump to be forced through the filtering flow path to the air purification means, or in a second mode to cause sump liquid discharged from the pump to be forced through the backwashing flow path.

First monitoring means are provided for detecting a change in an apparatus operating parameter, indicative of a predetermined lessening in the filtration efficiency of the filter means, and temporarily changing the switching means from their first mode to their second mode. The first monitoring means representatively are capable of detecting an increase in pumping back pressure upstream of the filter means as well as detecting particulate and/or gaseous pollutants.

According to other features of the invention, additional monitoring means are operative to sense a decrease in the normal concentration of chemical treatment additive in the sump liquid and/or a predetermined level of chemically treatable pollutants in the sump liquid and responsively inject a quantity of chemical treatment additive into the sump liquid from a source thereof, and dehumidification means are provided in the housing, downstream from the air purification means, and are operative to remove moisture from air exiting the air purification means.

In a preferred embodiment thereof, the air handling unit, which may representatively be a heating, ventilation and air conditioning unit or an air purification and controlled humidification unit, further comprises means for sensing variations in the temperature, humidity, suspended particles (total suspended particulate matter, TSP), and other pollutants in the air being discharged by the blower means within the housing and responsively causing changes in operation of the air handling unit, the air purification means, the air humidification and dehumidification means, and/or the air cooling and heating means which result in the system automatically and economically cleaning, treating and/or conditioning the air to achieve the ranges of temperature, humidity and air quality preset by the user within a reasonable time period.

Rather than the thermostat used to control a conventional HVAC unit, the "Liquid Spray Air Purification and Controlled Humidification" (LSAPCH) system uses an "Air Quality Monitor and Controller" (AQMC). The AQMC is electrically coupled to the sensing apparatus in the LSAPCH system which measures temperature, humidity, suspended particles and other pollutants in the air being discharged by the blower means. Such measurements are monitored by the AQMC and when they are outside the ranges preset by the user, the AQMC makes changes in the operation of the LSAPCH to achieve the level of temperature, humidity, suspended particles and other air quality parameters desired.

The following is an example of the operation of the LSAPCH system when measurements received by the AQMC indicate that there is an excess humidity condition in the air being discharged by the blower means whereas the temperature, suspended particles, and other air quality parameters are within the ranges preset by the user. In this event, the AQMC would send a signal to cause a portion of the discharged air to be returned to and operatively flowed across the dehumidification means before being forced outwardly through the outlet opening by the blower means, to thereby reduce the humidity of the air discharged from the housing. The housing may be provided with a second inlet opening, and the humidification control means may be further operative, in response to sensing an excess humidity condition in air being discharged by the blower means within the housing, to responsively permit the blower means to sequentially draw air inwardly through the second inlet opening, into the interior of the housing between the air purification means and the dehumidification means, and across the dehumidification means and into the fan inlet to further reduce the humidity of the air discharged from the housing.

In a preferred embodiment thereof, temperature, humidity, suspended particles and other air pollutants (collectively Temperature, Humidity and Air Pollutants or "THAP") are controlled within preset ranges by signals automatically sent by the AQMC to various components of the LSAPCH system. The LSAPCH system includes (1) damper means operable to controllably vary the flow of air through the air handling unit housing, (2) means to measure THAP located in the downstream portion of the LSAPCH system, (3) means to transmit such measurements to AQMC, and (4) AQMC to monitor such measurements and signal the damper means and/or other components of LSAPCH to cause operation of such components to clean, dehumidify, humidify, cool, or heat the air as required to return the conditioned air to the preset ranges of temperature, humidity, and air quality. In addition to the sensing apparatus located in the downstream portion of the LSAPCH system, a similar sensing apparatus may be located in the conditioned space external to the LSAPCH system to also permit measurement of temperature, humidity, suspended particles, and other pollutants in the air at room conditions. Therefore, the AQMC can be set to control the LSAPCH system based on measurements of temperature, humidity, suspended particles, and/or other pollutants of either (1) air being discharged by the blower means of the LSAPCH system or (2) air at room conditions external to the LSAPCH system.

BRIEF DESCRIPTION OF THE DRAWINGS

FIG. 1 is a schematic side elevational view of a representative heating, ventilation and air conditioning unit in which an improved liquid spray air purification system with a specially designed air quality monitor and controller (AQMC) embodying principles of the present invention is operatively incorporated;

FIG. 2 is an enlarged scale schematic cross-sectional view through the unit, and its associated air purification system, and illustrating in simplified form the interconnection between the AQMC; the heating, ventilation and air conditioning unit; and the liquid spray air purification system;

FIGS. 5A and 5B are schematic cross-sectional views through a free standing liquid spray air purification and humidification unit embodiment of the present invention incorporating the AQMC, with FIG. 5A illustrating the unit in its normal operating mode, and FIG. 5B illustrating the unit in a recirculating/blending operating mode thereof.

DETAILED DESCRIPTION OF THE PREFERRED EMBODIMENTS

Figure 4:
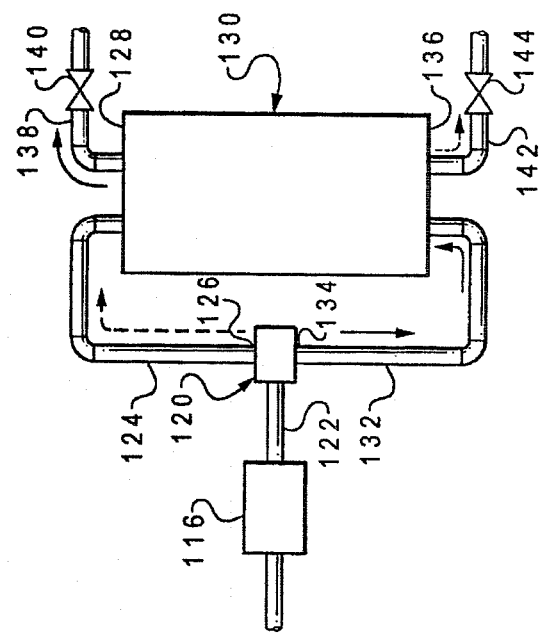
FIG. 4 is a partial top plan view of the liquid sump portion shown in FIG. 3.

Schematically depicted in FIGS. 1 and 2 is a heating, ventilation and air conditioning (HVAC) unit 10 incorporating therein a specially designed liquid spray air purification system 12 embodying principles of the present invention. HVAC unit 10 serves an interior space 14 disposed within a building 16 having an exterior wall 18 and a roof 20. The conditioned interior space 14 representatively has a vertical interior wall 22 and a ceiling 24 spaced downwardly apart from the roof 20. The unit 10 is supported within the space 26 between the roof 20 the ceiling 24, in a horizontal airflow orientation, on suitable support members 28, such as metal hanger rods or straps, secured to the roof structure.

Rather than the typical thermostat used to control a conventional HVAC unit of this general type, the unit 10 together with the system 12 are monitored and controlled by a specially designed air quality monitoring and control system 30 (hereinafter referred to simply as the "AQMC") embodying principles of the present invention and which may be mounted on interior wall 22.

AQMC 30 is electrically coupled to (1) a multi-parameter sensing apparatus 100 operatively associated with unit 10 and, as later described herein, including instruments to measure the temperature, humidity and suspended particles in the downstream portion of the unit 10, as well as a gas analyzer to measure other pollutants in the air in the downstream portion of unit 10, and (2) various components of the unit 10 and the liquid spray air purification system 12 that are selectively operated by AQMC 30 to achieve the level of temperature, humidity, and air quality ranges that have been preset as desired by the user. In addition to the sensing apparatus 100 located in the downstream portion of unit 10, a similar sensing apparatus may also be located in the conditioned space external to the unit 10 and system 12. This permits the AQMC 30 to be set to operate the unit 10 and the system 12 to achieve preset temperature, humidity, suspended particles, and/or other pollutants based on measurements of such parameters either of (1) air being discharged by the blower means of unit 10 and/or system 12 or (2) air at room conditions external to the unit 10 and system 12.

Still referring to FIGS. 1 and 2, the HVAC unit 10 includes a horizontally elongated hollow rectangular metal cabinet structure 32 having an open inlet end 34 and an open outlet end 36. From right to left as viewed in FIG. 2 the HVAC unit 10 has operatively disposed within its cabinet 32 a return air damper structure 38 adjacent the cabinet inlet end 34; a replaceable cartridge type air filter 40; a supply air blower 42; a heat exchanger 44; and a cooling coil 46. Representatively, the heat exchanger 44 is a fuel-fired heat exchanger having a burner structure 47 operatively associated therewith, and the cooling coil is of the direct expansion refrigerant type and is connected to conventional air conditioning refrigerant circuitry (not illustrated).

A return air duct 48 is interconnected between the cabinet inlet end 34 of the HVAC unit 10 and a suitable return air grille 50 mounted on the underside of the ceiling 24. At the opposite end of the unit 10 a main supply air duct 52 is connected to the cabinet outlet end 36 and extends horizontally through the above-ceiling space 26 as best illustrated in FIG. 1. Spaced apart branch supply air ducts 54 are operatively interconnected between the bottom of the main supply air duct 52 and a series of supply air diffusers 56 mounted on the underside of the ceiling 24 of the conditioned space 22 as schematically illustrated in FIG. 1.

When the AQMC 30 senses a need for heating or cooling; humidification or dehumidification; and/or removing suspended particles or other air pollutants, the AQMC 30 will energize the appropriate components of the unit 10 and/or the system 12. For example, if the AQMC 30 senses a need for heating or cooling, the blower 42 draws return air 58 upwardly into the cabinet 32, through the return air grille 50 and the return air duct 48, and then forces the air through the unit 10, across the heat exchanger 44 and the cooling coil 46, and into the main supply air duct 52. The heated or cooled air forced into the main supply air duct 52 is discharged into the space 22, in the form of conditioned air 58a, through the branch supply ducts 54 and the ceiling mounted air diffusers 56.

The HVAC unit 10 is merely representative of a wide variety of units, which may be generically referred to as "air handling" units, into which the air purification system 12 and the AQMC 30, which will be subsequently described herein, may be operatively incorporated. For example, while the unit 10 has been illustratively described as being adapted to both heat and cool the conditioned space 22, it could alternatively be a heating-only unit, a cooling-only unit, or simply a ventilating unit. Additionally, while the unit 10 has been depicted in a horizontal interior air flow orientation, it could also be alternatively oriented in a vertical air flow orientation (of either the upflow or downflow variety).

Referring again to FIG. 2, the air purification system 12 includes a horizontally oriented hollow rectangular metal housing 60 representatively disposed in an upwardly spaced apart relationship with the return air duct 48 and a rear end portion of the unit cabinet 32. Housing 60 has an open inlet end 62 that faces the exterior wall 18, and an open outlet end 64. Operatively disposed within the housing 60 are, from right to left as viewed in FIG. 2, upper outside air and lower return air flow control damper sections 66 and 68 positioned at the inlet end of the housing 60; a liquid dispersion unit 70; a liquid spray air cleaner structure 72; a mechanical mist eliminator 74; dehumidification cooling coils 76; and an auxiliary supply air blower 78 disposed at the outlet end of the housing 60. As later described herein, a liquid sump pan structure 80 is positioned within the housing 60 beneath the air purification system components 70, 72, 74 and 76.

A discharge duct 82 is connected between the outlet end 64 of the housing 60 and a top side portion of the unit cabinet 32, generally between the filter 40 and the blower 42, and serves to communicate the interiors of the housing 60 and the unit cabinet 32. An auxiliary return duct 84 is operatively connected between the ceiling mounted return air grille 50 and the damper section 68, and an outside air intake duct 86 is operatively connected between the damper section 66 and an outside air intake louver 88 mounted on the exterior wall 18.

During operation of the main unit 10, simultaneous operation of the purification system air blower 78 draws return air 58 into the housing 60 sequentially through the a portion of the return air grille 50, the auxiliary return air duct 84 and the damper section 68. At the same time, outside air 90 is also drawn into the housing 60 sequentially through the outside air intake louver 88, the outside air duct 86 and the damper section 66. By the operation of the blower 78, these incoming quantities of return air and outside air are flowed across the purification and humidification components 70, 72, 74 and 76 to form a quantity of purified air 92 that is delivered into the unit cabinet 32 between the filter 40 and the main supply air blower 42. Together with the return air 58 entering the cabinet 32 through the damper section 38 and the filter 40 the purified air 92 forms the conditioned air 58a discharged from the supply air diffusers 56 (see FIG. 1).

It should be noted that both the purified air percentage of the conditioned air 58a delivered to the space 22 served by the unit 10, as well as the outside air-to-return air ratio of the purified air 92, may be conveniently controlled by suitable adjustment of the three damper sections 38, 66 and 68—an adjustment that may be carried out manually or automatically depending upon the degree and type of air proportioning control desired in conjunction with the overall operation of the unit 10 and its associated air purification system 12. For example, the damper sections 38 and 68 shown in FIG. 2 are linked (as schematically indicated by the dashed line 94) in a manner such that a movement of the vanes of the damper section 38 toward their closed positions correspondingly moves the vanes of the damper section 68 toward their fully open positions, and vice versa. This permits the regulation of the total percentage of the discharge air 58a which has traversed the purification system 12.

Further, the damper sections 66 and 68 may be linked together in a manner such that movement of the vanes in the damper section 68 toward their fully closed positions automatically move the vanes in the damper section 66 toward their fully open positions, and vice versa. This permits the selective varying of the outside air-to-return air ratio of the purified air 92.

Still referring to FIG. 2, the water dispersion unit 70 is basically a pad of fibrous matting material (such as shredded plastic, fiberglass or metal) similar to the spray pad material used in evaporative coolers and is operative to receive a throughflow of air while at the same time being impinged upon by a cleansing liquid spray. The air cleaner structure 72 is representatively a horizontally spaced series of vertically extending tubes 96 having discharge orifices formed along their lengths and facing the downstream side of the water dispersion unit 70. The mist eliminator 74 representatively comprises a plurality of vertically spaced rows of horizontally extending angled baffle members 98 which, in a right-to-left direction define a zigzag air flow path through the overall mist eliminator structure.

The dehumidification cooling coils 76, which are preferably included in the purification system 12, representatively are direct expansion refrigerant cooling coils the operation of which may be controlled by the AQMC 30 which receives signals from the multi-parameter sensing apparatus 100 that measures temperature, humidity, suspended particles and other air pollutants in air being discharged by the blower 42 and is operatively disposed in the main supply air duct 52. Other dehumidification means, such as an electrostatic precipitator, chemical dehumidifier, centrifugal mist eliminator, mist eliminator pad or desiccant pad or the like, may be used in place of or in addition to the coils 76 if desired. As will additionally be appreciated, the cooling medium for the coils 76 could be one other than refrigerant (such as chilled water) if desired.

During operation of the purification system blower 78 return air 58 and outside air 90 entering the inlet end 62 of the system housing 60 are drawn through the dispersion unit 70 while pressurized water 102, supplied to the tubes 96 from a subsequently described source, is sprayed onto the left or downstream side of the dispersion unit 70. Particulate and chemical pollutants in the return air/outside air mixture passing through the dispersion unit 70, such as dust, pollen, smoke, aerosols, ozone, nitrogen oxides, sulfur oxides, carbon dioxides and carbon monoxides, formaldehyde, fluorine, hydrogen sulfide and hydrocarbons, are absorbed into the impinging water spray and thus are drained with the spent water into the sump structure 80.

The purified, now moisture-laden return air/outside air mixture is then drawn, via the aforementioned zigzag path, through the mist eliminator 74 which functions to mechanically remove a substantial portion of the moisture from the return air/outside air mixture. Water mechanically removed from the air in this manner is drained from the mist eliminator 74 and falls into the sump pan 80. Further moisture is removed from the air exiting the mist eliminator 74 by the dehumidification of the coils 76 as automatically called for by the AQMC 30 with measurements received from the multi-parameter sensing apparatus 100. Accordingly, the air 92 entering the unit cabinet 32 is both cleansed of pollutants and dehumidified before being mixed with the return air 58 exiting the filter 40 and delivered to the conditioned space 22.

Figure 3:
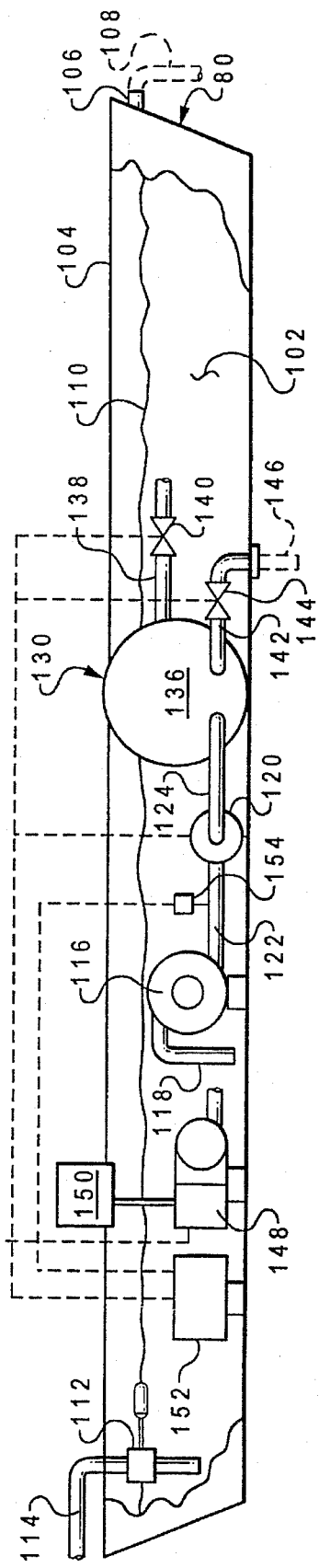
FIG. 3 is an enlarged scale partially cut away schematic side elevational view of a liquid sump portion of the air purification system and illustrates the operative coupling of the AQMC to the liquid sump portion.

Turning now to FIGS. 3 and 4, the sump pan 80 has an open top side 104 and an overflow fitting 106 secured to a side wall of the sump pan, just beneath its open top side, and connected to a suitable drain line 108 that is tied into the building drainage system. A quantity of water 102 is continuously maintained in the sump pan 80, at an operating level 110, by the operation of a float-operated fill valve 112 connected to a suitable water makeup supply pipe 114. Appropriate heating and/or cooling means (not illustrated) may be used to control the temperature of the water if desired.

A spray pump 116 is supported in the sump pan 80 and has an open-ended inlet pipe 118 submerged in the water 102. The outlet of the pump 116 is connected to the inlet of a two-way switchable diverting valve 120 by a discharge pipe 122. A pipe 124 is interconnected between the normally closed outlet port 126 of valve 120 and an end 128 of a cylindrical, backwashable filter structure 130, and a pipe 132 is connected between the normally open outlet port 134 of the valve 120 and the opposite end 136 of the filter structure 130.

A supply pipe 138 has a switchable, normally open valve 140 therein and is connected at one end to the end 128 of the filter structure 130 and at the opposite end to the vertical pipes 96 of the liquid spray air cleaner structure 72 (see FIG. 2). A discharge pipe 142 has a switchable, normally closed valve 144 therein and is connected at one end to the end 136 of the filter structure 130, and at its opposite end to a drain line 146 extending from the bottom side of the sump pan and connected to the building drainage system.

During normal operation of the purification system 12 the pump 116 forces water 102 from the sump pan 80 to the spray pipes 96 sequentially through the pipe 122, the normally open outlet 134 of the valve 120, the interior of the filter 130, and the pipe 138 (as indicated by the solid line flow arrows in FIG. 4) to thereby create the water spray that continuously impinges on the downstream side of the water dispersion unit 70 (see FIG. 2). Pollutant-bearing water also continuously drains from the previously described air purifying components of the system 12 back into the sump pan 80 and is recycled through and cleansed by the filter structure 130 on its way back to such air purifying components.

Even with the pollutant cleansing action of the filter 130, as the filter nears its fully loaded state the levels of various contaminants in the sump water will increase. A monitor and additive injector 148 is disposed in the sump water 102 and is operative to sense a decrease in the normal concentration of chemical treatment additive in the water and/or the buildup therein of undesirable water pollutants, such as algae, slime, bacteria and fungi, and responsively inject a suitable chemical additive, from an additive container 150 connected to the monitor/injector 148, into the sump water to control the buildup of these water pollutants and thereby reduce their deleterious effects on the air cleansing efficiency of the recirculating sump water. In addition, when the AQMC 30 receives signals from the sensing apparatus 100 that indicate the presence of difficult to remove air pollutants, the AQMC 30 activates the monitor/injector 148 to inject a suitable chemical treatment additive from additive container 150 into the sump water to assist in cleaning the air. The additive in the container 150 may representatively contain (1) selected non-toxic organic or inorganic chemicals which assist in cleaning the air of difficult to remove pollutants and/or (2) non-toxic bactericides, fungicides, herbicides and the like to control the aforementioned water pollutants.

A monitor and filtering control structure 152 is also disposed in the sump water 102 and is electrically coupled to the valves 120,140 and 144 via the schematically depicted dashed control lines in FIG. 3. The monitor/control structure 152 is operative to sense an increase in back pressure indicated by a pressure transducer 154 located in pump discharge pipe 122 upstream of the filter 130 and/or the presence of a predetermined maximum level of particulate and gaseous air pollutants in the sump water 102 (which have been withdrawn from the air flowing through the purification system) and responsively switch the valves 120, 140 and 144 in a manner (1) opening the normally closed outlet 126 in valve 120 and closing its normally open outlet 134, (2) closing the normally open valve 140, and (3) opening the normally closed valve 144.

The switching of these three valves causes the water being discharged from the pump 116 to backwash the filter 130 by forcing sump water sequentially through the pipe 122, the opened valve outlet 126, through the filter 130 from top to bottom as viewed in FIG. 4, and through the pipe 142 and the opened valve 144 into the drain pipe 146 as indicated by the dashed line flow arrows in FIG. 4. Accordingly, the trapped particulate matter and other pollutant matter in the filter are flushed into the building drainage system via the drain pipe 146. In response to the resulting drop in the sump water level, the float-operated fill valve 112 opens to replenish the sump water supply with clean water. When the particulate/gaseous pollutant level in the sump water falls to an acceptable level, the monitor structure 152 responsively permits the valves 120,140 and 144 to return to their normal operating positions to permit the pump 116 to deliver water to the liquid spray air cleaner structure 72 through the now backwashed filter 130.

As can be seen from the foregoing, the incorporation of the air purification system 12 into the representative air handling unit 10 affords the unit the ability to continuously flow highly purified air into the conditioned interior building space 22 served by the unit. The cooperative use of the damper structures 38,66 and 68 permits control of the overall volumetric air cleansing rate of the purification system 12 while at the same time permitting a selectively variable quantity of outside ventilation air to be introduced into the conditioned space. Moreover, the automatic control characteristics of the liquid spray purification system 12 substantially reduce the amount of inspection and maintenance time required to keep it in good working order. The unit 10 is thus quite suitable for both residential and commercial heating, ventilating and air conditioning applications.

The liquid spray-based air purification principles of the present invention may also be incorporated in other types of air handling units as illustrated by the air purification and controlled humidification unit 160 and the AQMC 30, both schematically depicted in FIGS. 5A and 5B. The unit 160 is a free standing structure adapted to be supported on a floor 162 or other horizontal support surface, and includes a vertically elongated rectangular housing 164 having front and rear exterior side walls 165 and 166, a top end wall 168, opposite left and right exterior side walls 169 extending between the front and rear exterior side walls 165 and 166, and a vertically extending interior partition wall 170 that divides the interior of the housing 164 into front and rear plenum areas 171a and 171b. A vertically spaced pair of air inlet grilles 172,174 are mounted on the rear housing side wall 166, with the air inlet grille 172 being positioned adjacent the bottom end of the housing 164, and the air inlet grille 174 being spaced upwardly apart from the air inlet grille 172 on a vertically intermediate portion of the rear housing side wall 166.

The air inlet grille 172 is communicated with a lower end portion of the front plenum area 171a via a transfer duct 176 extending horizontally through the rear plenum area 171b between the air inlet grille 172 and a suitable opening in the vertical partition wall 170. Installed in a right end portion of the transfer duct 176 is an electrically operable, normally open motorized air flow control damper structure 178. The air inlet grille 174 is communicated with a vertically intermediate portion of the front plenum area 171a via a transfer duct 180 extending horizontally through the rear plenum area 171b between the air inlet grille 174 and a suitable opening in the vertical partition wall 170. Installed in a right end portion of the transfer duct 180 is an electrically operable, normally closed motorized air flow control damper structure 182. Positioned immediately above the control damper structure 182 in an opening in the partition wall 170 is an electrically operable, normally closed motorized air flow control damper structure 184 through which the plenum areas 171a,171b are communicated.

An air discharge grille 186 is mounted on the top end of the front side wall 165 over an electrically operable, normally open motorized air flow control damper structure 188 that faces and is forwardly spaced apart from an electrically operable, normally closed motorized air flow control damper structure 190 mounted in an opening in the top end of the vertical partition wall 170.

Vertically arranged in the front plenum area 171a are air purification and controlled humidification components similar to those incorporated in the previously described air purification system 12 schematically depicted in FIGS. 2–4. These components, which have been given reference numerals identical to those of their counterparts in FIGS. 2–4, include, from top to bottom in FIGS. 5A and 5B, (1) a supply air blower 78 and dehumidification cooling coils 76 vertically positioned between the damper structures 188,190 and the damper structure 184; (2) a mechanical mist eliminator 74, a liquid spray air cleaner structure 72, and a liquid dispersion unit 70 vertically positioned between the damper structures 182,178; and (3) a liquid sump pan structure 80 positioned at the bottom end of the front plenum area 171a.

Mounted within the sump pan structure 80 is a schematically indicated pumping, filtering and pollution monitoring system 192 whose components are identical to those depicted in the previously described FIGS. 3 and 4. The components of the system 192 are connected to the liquid spray air cleaner structure 72 in the same manner as their counterpart components in FIGS. 3 and 4 are connected to the liquid spray air cleaner structure 72 in FIG. 2. During operation of the air purification and controlled humidification unit 160, water draining from the components 70,72,74 and 76 falls into the liquid sump pan structure 80. As previously described, the sensing apparatus 100 measures temperature, humidity, suspended particles and other pollutants in the air and, in this particular application, is mounted in an upper end portion of the front plenum area 171a. Sensing apparatus 100 is wired to the AQMC 30 and, as subsequently described herein, sends temperature, humidity and air quality measurements to the AQMC 30 which is operatively wired to (1) the motorized damper structures 178, 182, 184, 188 and 190, (2) the supply air blower 78, (3) the coils 76 for dehumidification and/or cooling, (4) the air cleaner structure 72, and (5) appropriate components of the sump pan 80 as schematically indicated by the dotted line electrical circuitry 196.

Referring now to FIG. 5A, during normal operation of the unit 160 the damper structures 182, 184 and 190 are fully closed, and the damper structures 178 and 188 are fully open. Operation of the supply air blower 78 draws air 198 from the conditioned space 200 served by the unit 160 sequentially through the air inlet grille 172, the transfer duct 176, the damper structure 178, and upwardly through the front plenum area 171a across the vertically arranged air purification and controlled humidification components 70–76, and then discharges the air outwardly through the damper structure 188 and the air discharge grille 186 into the conditioned space 200 in the form of purified air 198a with controlled humidity.

As schematically indicated in FIG. 5B, upon sensing, via output signals from the sensing apparatus 100, that the humidity in the discharged air 198a is above a predetermined set point humidity, the AQMC 30, via the electrical circuitry 196, functions to partially close the damper structure 178, partially open the damper structures 182 and 184, partially close the damper structure 188, and partially open the damper structure 190. This repositioning of the various damper structures by the AQMC 30, during operation of the blower 78, reduces the flow rate of room air 198 being drawn inwardly through the air inlet grille 172 and passing upwardly through the purification and humidification components 70–74, while at the same time permitting a second flow of room air 198 to be drawn inwardly through the return air grille 174 and into the portion of the front plenum area 171a between the mist eliminator 74 and the coils 76, thereby bypassing the moisture-adding portion of the air purification and humidification system.

These two flows of room air 198 are then drawn upwardly through the blower 78 and discharged therefrom into an upper end portion of the front plenum area 171a. As indicated in FIG. 5B, a first portion of this discharged air 198 is forced outwardly through the air discharge grille 186 as purified air 198a with controlled humidity, and a second portion of the discharged air 198 is sequentially flowed leftwardly through the damper structure 190, downwardly through the rear plenum area 171b, rightwardly through the damper structure 184 into the space between the coil 76 and the mist eliminator 74, and then upwardly across the coils 76.

Accordingly, with the various damper structures in their AQMC 30-controlled FIG. 5B positions, the purified and controlled humidity air 198a delivered to the conditioned space 200 by the unit 160 has a lower moisture content than when the damper structures are in their FIG. 5A orientation. As can be seen from FIG. 5B, this lowered moisture content in the supply air 198a is achieved by (1) causing utilization of all the dehumidifying coils 76 to thereby remove more water from the air, (2) causing a portion of the room air 198 entering the unit 160 to bypass the moisture-adding components 70 and 72, and (3) causing a portion of the air 198 discharged by the blower 78 to be cycled back across the dehumidifying coils 76 before being delivered to the conditioned space 200.

The damper structures 178,182,184,188 and 190 may be moved by action of the AQMC 30 only between their two indicated positions shown in FIGS. 5A and 5B. Alternatively, the damper structures may be moved to further positions by the AQMC 30 to provide, as needed, for even greater moisture reduction in the air 198a delivered to the conditioned space 200. For example, the AQMC 30, after the damper structures were moved to their FIG. 5B positions, could be used to further open the damper structures 182, 184 and 190, and further close the damper structures 178 and 188 if movement of the damper structures to their initial FIG. 5B positions did not eliminate excessive moisture in the air 198a delivered to the conditioned space 200. This further repositioning of the damper structures would reduce the air flow across the humidifying components and at the same time increase the air flow bypassing the humidifying components and operatively traversing the dehumidifying cooling coils 76. While the air handling unit 160 has been representatively illustrated as being in a vertical, free standing orientation, it will be readily appreciated by those of skill in this particular art that it could alternatively be arranged in a horizontal orientation as well if desired.

Figure 6:
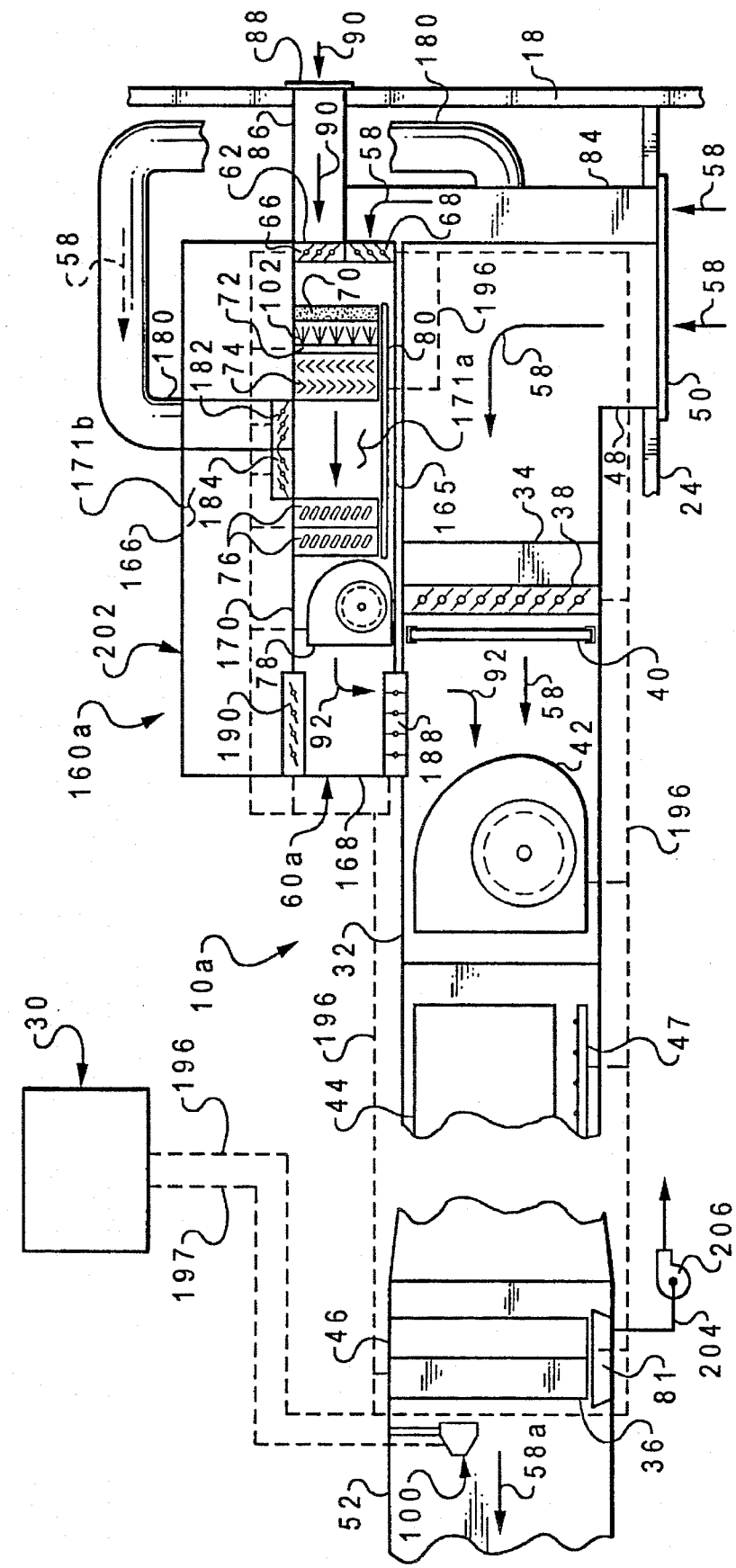
FIG. 6 is a schematic side elevational view of an alternative embodiment of the heating, ventilation and air conditioning unit illustrated in FIG. 1 and similarly incorporating the AQMC.

Illustrated in FIG. 6 is an alternate embodiment 10a of the HVAC unit 10 previously described in conjunction with FIGS. 1–4. HVAC unit 10a incorporates therein the same components as the unit 10, and additionally incorporates a modified air purification and controlled humidification unit 160a having therein various indicated components of the air purification and controlled humidification unit 160 previously described in conjunction with FIGS. 5A and 5B. For ease in comparing the HVAC unit 10a to the previously described units 10 and 160, components and structures in the modified unit 10a similar to those in the previously described units 10 and 160 have been given identical reference numerals.

The HVAC unit 10a shown in FIG. 6 is provided with a modified purification system housing 60a which, relative to the housing 60 described in FIG. 1, is horizontally lengthened, and is positioned closely adjacent the top side of the cabinet 32. The modified housing 60a has a left end wall 168 corresponding to the top end wall 168 of the unit 160, a top side wall 170 corresponding to the partition wall 170 in the unit 160, and a bottom side wall 165 corresponding to the side wall 165 in the unit 160. An auxiliary housing 202 is positioned over the top side 170 of the modified housing 60a and has a top side wall 166 corresponding to the side wall 166 in the unit 160. The interiors 171a,171b of the housings 60a,202 respectively correspond to the plenum areas 171a, 171b in the housing portion 164 of the unit 160 shown in FIGS. 5A and 5B.

The air purification and humidification components 70,72,74,76 and 78 are positioned as shown within the modified housing 60a, with the components 74 and 76 being horizontally separated from one another a substantially greater distance than their counterpart components in the HVAC unit 10. The interior 171a of the housing 60a, downstream of the fan 78, is communicated with the interior of the cabinet 32, between the filter 40 and the fan 42, by the normally open damper structure 188 which is positioned directly beneath the normally closed damper structure 190 mounted in the housing wall 170. Damper structures 182, 184 are mounted in the housing wall 170 between the coils 76 and the mist eliminator 74, and the sump pan structure 80 extends beneath the components 70,72,74 and 76. Operatively mounted in the sump pan structure is the pumping, filtering and monitoring system having components identical to those shown in FIGS. 3 and 4.

A drain pan 81 is positioned beneath the main cooling coil 46, to catch condensate dripping therefrom during operation of the HVAC unit 10a, and a condensate drain line 204 having a condensate pump 206 installed therein is interconnected between the drain pan 81 and the sump pan structure 80. During operation of the HVAC unit 10a, condensate received in the drain pan 81 is transferred into the sump pan structure 80, via the line 204, by the pump 206. The transfer duct 180 extends through the housing 202, is connected at one end thereof to the damper structure 182, and is connected at its other end to the auxiliary return air duct 84 as indicated. Via the schematically depicted control circuitry 196, the AQMC 30 is operatively connected to the system components indicated in FIG. 6.

During normal operation of the HVAC unit 10a, as illustrated in FIG. 6, the damper structures 182,184 and 190 are fully closed and the damper structures 66,68 and 188 are fully open, and the HVAC unit 10a operates in essentially the same manner as the previously described HVAC unit 10. Specifically, the purification system blower 78 draws return air 58 and outside air 90 through damper structures 68 and 66, respectively, into the plenum 171a. These two air streams are mixed as they are drawn through the dispersion unit 70 and pressurized water 102 from the liquid spray air cleaner structure 72, and then through the mist eliminator 74 and dehumidification cooling coils 76. Excess water from components 70,72,74 and 76 flows by gravity into the sump pan structure 80 positioned below such components. As the air flows through the housing 60a, it is washed by water, excess water is removed, and humidity is reduced to form purified air 92 with controlled humidity. Then such air 92 passes through damper structure 188 into the unit cabinet 32 of the HVAC unit 10a where it mixes with return air 58 which has entered cabinet 32 through the damper structure 38 and the filter 40.

Further humidity control is provided to the air mixture 92/58 as it flows through (1) the heat exchanger 44 when the unit 10a is operating in the winter and (2) the cooling coils 46 when the unit 10a is operating in the summer. Water removed from the air mixture 92/58 by the cooling coils 46 drips into the drain pan 81. As previously mentioned, this water is pumped from drain pan 81 to the liquid sump pan structure 80. The pumping, filtering and pollution monitoring system within the sump pan structure 80 returns the water for recycling through the liquid spray air cleaner structure 72.

The humidity of the resulting conditioned air 58a is measured by the sensing apparatus 100 which also measures temperature, suspended particles and other pollutants in the air and transmits such measurements to the AQMC 30. In the event the humidity of the conditioned air 58a is below a predetermined set point humidity (i.e., humidity needs to be increased), the AQMC 30, via the electrical circuitry 196, automatically calls for (1) a reduction in dehumidification by coils 76 and/or (2) an increase in return air 58 and/or outside air 90 flowing through unit 160a by partially opening damper structures 68 and 66 as well as a corresponding reduction in return air 58 entering cabinet 32 by partially closing damper structure 38.

If the humidity of the conditioned air 58a is above a predetermined set point humidity, the AQMC 30 automatically calls for (1) an increase in the dehumidification by coils 76 and/or (2) a reduction in return air 58 and/or outside air 90 flowing through housing 60a by partially closing damper structures 68 and 66 as well as a corresponding increase in return air 58 entering cabinet 32 by partially opening damper structure 38. In the event the humidity of conditioned air 58a is still above a predetermined set point humidity, the AQMC 30 functions to partially close damper structures 66 and 68, partially open damper structures 182 and 184, partially close damper structure 188, and partially open damper structure 190. Lower moisture content in the purified air 92 with controlled humidity is achieved by (1) causing utilization of all dehumidifying coils 76 to thereby remove more water from the air, (2) changing the ratio of purified 92 to the return air 58, (3) causing a portion of the room air 58 entering the housing 60a to bypass the moisture-adding components 70 and 72, and (4) causing a portion of the air 92 discharged by the blower 78 to be cycled back across the dehumidifying coils 76 before being delivered to the cabinet 32.

In a manner similar to the example just described for increasing or decreasing the humidity of the conditioned air 58a, the AQMC 30 automatically calls for operation of the appropriate components of the HVAC units 10 and 10a and the air purification and controlled humidification systems 12, 160, and 160a as needed to sufficiently change the temperature, suspended particles, and other air pollutants and thereby achieve the temperature and air quality ranges preset by the user on the AQMC 30.

Figure 7:
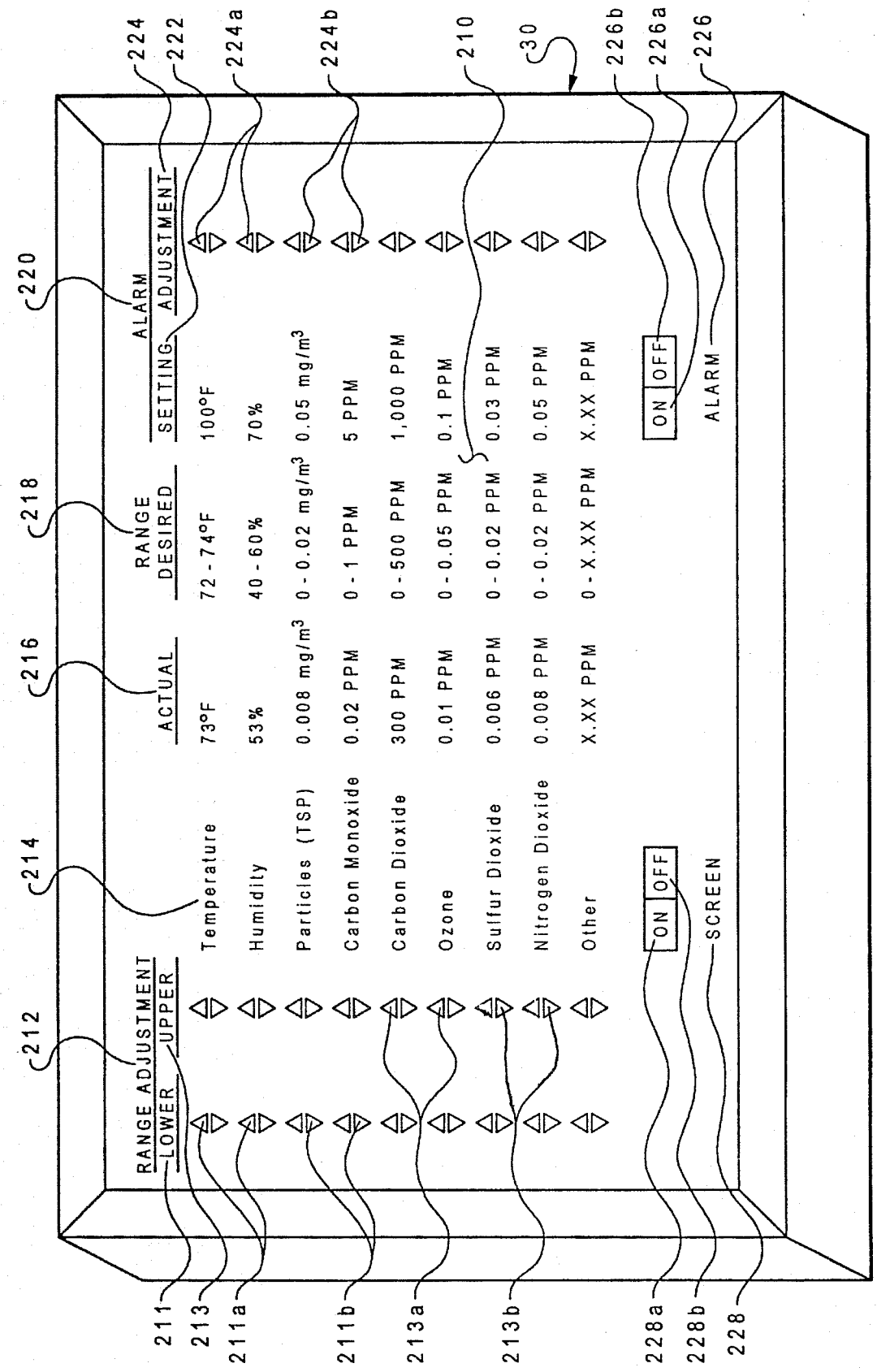
FIG. 7 is an enlarged scale front side perspective view of a control/display panel portion of the AQMC.

FIG. 7 illustrates the Air Quality Monitor and Controller (AQMC) 30. The AQMC 30 is an integral part of the HVAC units 10 and 10a and air purification and controlled humidification systems 12, 160, and 160a as it automatically monitors these units and systems and controls their operation to achieve the ranges of temperature, humidity and air quality desired by the user. In general, the AQMC 30 provides (1) means for the user to preset the desired ranges of temperature, humidity, suspended particles and other pollutants in the conditioned air (58a in FIGS. 1, 2, and 6 and 198a in FIGS. 5A and 5B); (2) means for automatically monitoring the conditioned air (58a in FIGS. 1, 2, and 6 and 198a in FIGS. 5A and 5B) to determine if such ranges are achieved and maintained; (3) means for automatically activating the operation of the appropriate components of the units 10 and 10a and/or systems 12, 160, and 160a as necessary to achieve the temperature, humidity and air quality ranges preset by the user on the AQMC 30; and (4) means for achieving substantial savings in electrical energy costs by continually monitoring the conditioned air (58a in FIGS. 1, 2, and 6 and 198a in FIGS. 5A and 5B) via the multi-parameter sensing apparatus 100 (see FIGS. 2, 5A, 5B, and 6) and operating only those components in such units and/or systems that are actually necessary to achieve the preset ranges of temperature, humidity and air quality. When such ranges are achieved, the AQMC 30 stops the operation of unnecessary components.

FIG. 7 illustrates several features of the AQMC 30. Normally the AQMC 30 is mounted on a wall similar to the location of a conventional thermostat. However, the AQMC 30 may be located anyplace that is convenient to the user provided that it is electrically coupled, as is illustrated by the schematic lines 196 and 197 in FIGS. 2, 5A, 5B and 6, to (1) sensing apparatus 100 that measures temperature, humidity, suspended particles and other pollutants in the conditioned air which are monitored by the AQMC 30 and (2) the various components of units 10 and 10a and systems 12, 160, and 160a which are controlled and operated by the AQMC 30.

The AQMC 30 includes a small, subsequently described computer (not illustrated in FIG. 7) operatively associated with a display screen 210 upon which various information and measurements from such computer are displayed. The column 214 showing "Temperature, Humidity, Particles (TSP), Carbon Monoxide . . . Other" is a listing of items to be monitored and controlled by the AQMC 30; it should be noted that these items are shown for purposes of illustration only and that many other air pollutants (such as formaldehyde, hydrocarbons, fluorine, and hydrogen sulfide) and air quality parameters could be included. The "Actual" column 216 shows representative actual measurements of Temperature at 73° F., Humidity at 53%, Particles (Total Suspended Particles, "TSP") at 0.008 mg/m$^3$, Carbon Monoxide at 0.02 PPM, etc. As previously indicated, the AQMC 30 may be set to operate units 10 and 10a and systems 12, 160 and 160a based on measurements of temperature, humidity, suspended particles, and/or other pollutants of either (1) air as it is being discharged from such units or systems, or (2) air at room conditions external to such units or systems.

In addition to temperature, humidity and suspended particles, the AQMC 30 receives measurements from sensing apparatus 100 of the presence and concentration of various selected gaseous pollutants that are hazardous or harmful to the health of the occupants of any indoor area such as residences, offices, factories, chemical plants, hospitals, schools, subways, etc. as well as of transportation vehicles such as automobiles, trucks, trains, airplanes, etc. Although many of these gaseous pollutants are shown for illustration purposes in column 214 of FIG. 7, the user or manufacturer may elect to simplify the readout by having the screen 210 display (1) temperature and humidity only, (2) temperature, humidity, and suspended particles only, (3) temperature, humidity, suspended particles and one or more selected gaseous pollutants, or (4) temperature, humidity, suspended particles and only those gaseous pollutants, if any, that are outside of the Range Desired column 218. In other words, regardless of what the user or manufacturer elects to have displayed on the screen 210, the AQMC 30 monitors the measurements of temperature, humidity, suspended particles, and all gaseous pollutants and controls the operation of the appropriate components of units 10 and 10a and systems 12, 160, and 160a to maintain such measurements within ranges preset in the AQMC 30. It is envisioned that the manufacturer will determine the specific gaseous pollutants that are to be measured and monitored as these may vary by area and application; therefore, the AQMC 30 with sensing apparatus 100 may be set for some applications to detect, measure and monitor a limited number of specific gaseous pollutants whereas in other applications the AQMC 30 and sensing apparatus 100 may be set to measure a much broader range of gaseous pollutants.

Also in FIG. 7, the "Range Desired" column 218 shows the ranges selected by the user which for illustration purposes are Temperature: 72°–74° F.; Humidity: 40–60%; Particles (TSP): 0–0.02 mg/m$^3$; Carbon Monoxide: 0–1 PPM; Carbon Dioxide: 0–500 PPM; etc. It is envisioned that the manufacturer would select reasonable ranges for column 218; such ranges could be changed to those desired by the user but could also be restored to the original manufacturer's ranges by the user as a "default" setting.

The "Range Adjustment" (RA) column 212 includes Lower RA column 211 with (1) keys 211a to raise the lower setting of the Range Desired column 218 and (2) keys 211b to reduce the lower setting of column 218. Also, the RA column 212 includes Upper RA column 213 with (1) keys 213a to raise the upper setting of the Range Desired column 218 and (2) keys 213b to reduce the upper setting of column 218. For example, to change the Temperature Range Desired column 218 from 72°–74° F. to 70°–75° F., the user would push (1) the temperature key 211b two times to change the lower setting from 72° F. to 70° F. and (2) the temperature key 213a one time to change the upper setting from 74° F. to 75° F.

The "Alarm" column 220 includes an Alarm Setting column 222 that shows the setting at which the AQMC 30 would activate an alarm to (1) alert the user of a system malfunction or emergency condition, (2) alert an off-site security monitoring firm to ensure that corrective action is taken to eliminate such dangerous condition (if so desired by the user), and (3) turn off the system if such condition is not corrected within a preset time period. For example, if the Actual Temperature reading in column 216 reached or exceeded the 100° F. setting in column 222, an alarm would be activated.

Also, the "Alarm" column 220 includes an Alarm Adjustment column 224 with (1) keys 224a to raise the Alarm setting column 222 and (2) keys 224b to lower the Alarm setting column 222. For example, to lower the Temperature Alarm Setting column 222 from 100° F. to 90° F., the user would push the temperature key 224b ten times. As mentioned for the Range Desired column 218, it is also envisioned that the manufacturer would select reasonable Alarm settings for column 222; such settings could be changed to those desired by the user but could also be restored by the user to the original manufacturer's settings as a default setting.

The AQMC 30 includes an Alarm control 226 with an "On" switch 226a to allow the user to arm the alarm and an "Off" switch 226b to allow the user to (1) disarm the alarm or (2) turn off the alarm after it has been activated by the AQMC 30.

The AQMC 30 also includes a Screen control 228 with an "On" switch 228a to allow the user to turn on the screen and an "Off" switch 228b for turning off the screen. To conserve electricity and screen life, the screen 210 can be set to automatically turn off after displaying its measurements and other information for a reasonable time such as one minute. The screen 210 is simply a means of displaying information from the AQMC 30. The screen 210 does not affect the operation of the AQMC 30, units 10 and 10a, or systems 12, 160 and 160a, all of which continue to function whether the screen 210 is on or off. In addition, the screen 210 can be lighted for use in the dark or its information and measurements can be displayed with lighted letters and numbers similar to those used on a digital clock.

As mentioned previously, the AQMC 30 can be set to operate the HVAC units 10 and 10a and Air Purification and Controlled Humidification systems 12, 160 and 160a based on measurements of temperature, humidity, suspended particles, and gaseous pollutants as follows: Condition A—measurement of the air at room conditions at the location of the AQMC 30 (using sensors similar to those in the apparatus 100 but positioned outside the particular air handling unit within the conditioned space) or Condition B—measurement of the conditioned air as it is being discharged from the units 10 and 10a. For example, to change the basis for such operation for temperature and humidity from Condition A to Condition B, the user simultaneously pushes all four RA temperature keys (211a, 211b, 213a, and 213b) and then simultaneously pushes all four RA humidity keys (211a, 211b, 213a, and 213b). The AQMC 30 will then change the temperature/humidity basis for operation of units 10 and 10a and systems 12, 160, and 160a from Condition A to Condition B. The user can change the basis for such operation back to Condition A by again simultaneously pushing all four RA temperature keys and then simultaneously pushing all four RA humidity keys.

As will be appreciated, the principles of the liquid spray-based air purification with the AQMC 30/apparatus 100 measurement, monitoring and control system may also be incorporated in other applications. For example, by eliminating the need to monitor and control the air temperature and humidity, air purification may be provided for outside applications. Such an outside system would incorporate (1) means to purify the air, (2) means to measure and monitor the suspended particles and other pollutants in the clean air, and (3) means to control the operation of the air purification system. It can be readily appreciated by those of skill in this particular art that the various air purification, monitoring, and control components illustrated in FIG. 2 may be combined to effectively and economically clean the air for outdoor applications. Referring to FIG. 2, such an outdoor system would incorporate (1) a housing 60 with an open inlet end 62 and open outlet end 64, (2) a liquid dispersion unit 70, (3) a liquid spray air cleaner structure 72, (4) a mechanical mist eliminator 74, (5) a liquid sump pan 80 (as shown with more detail in FIGS. 3 and 4), (6) an air supply blower 78 disposed near the outlet end of the housing 60, (7) an apparatus 100 that measures suspended particles and gaseous pollutants in the air and which is disposed downstream of the air blower 78 at the outlet end of the housing 60, and (8) an AQMC 30. Such AQMC 30 is electrically coupled (1) to the apparatus 100 that sends measurements of suspended particles and gaseous pollutants to the AQMC 30 and (2) to the various components 72, 78 and 80 the operation of which are controlled by the AQMC 30. Outside applications include smoke stacks, chemical plants, parking garages, freeway toll booths, industrial areas, and other areas that have outdoor air pollution problems. It will also be appreciated that some applications may simply require the AQMC 30/apparatus 100 to measure and monitor compliance with existing clean air guidelines.

Figure 8:
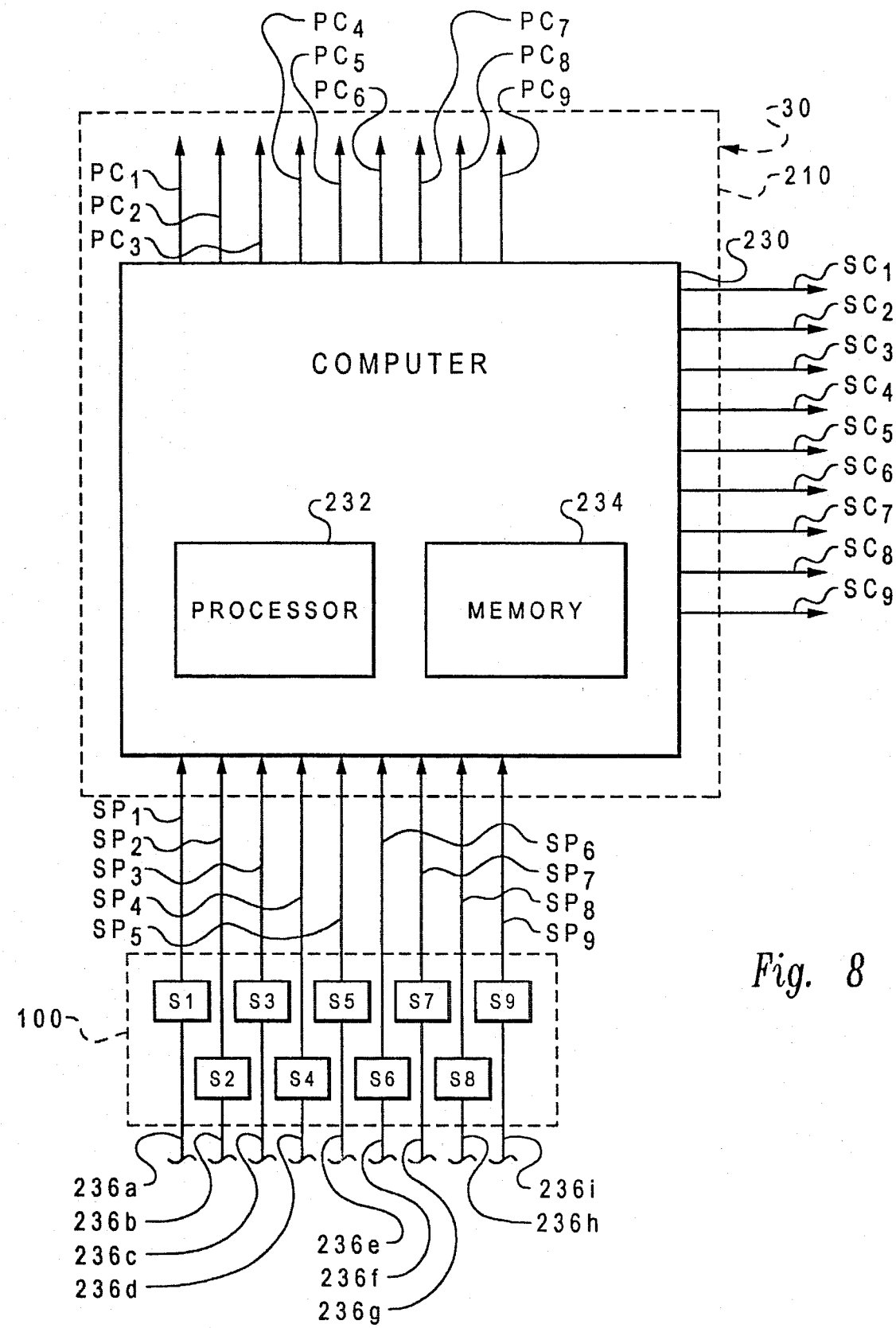
FIG. 8 is a schematic block diagram of the AQMC.

Turning now to the schematic block diagram of FIG. 8, the AQMC 30 incorporates therein a small computer 230 with suitable processor and preprogrammed memory portions 232 and 234. The multi-parameter sensing apparatus 100 has operatively associated therewith a series of sensors S1–S9 that respectively sense, via the schematically depicted parameter sensing lead lines 236a–236i, the temperature, humidity, and levels of suspended particles, carbon monoxide, carbon dioxide, ozone, sulfur dioxide, nitrogen dioxide, and other pollutants in the space being monitored. The monitored space, as previously mentioned, may be in the air discharge of the particular air handling unit with which the AQMC 30 is associated, or outside of the air handling unit in the conditioned space.

Upon sensing the predetermined environmental parameters, the sensors S1–S9 responsively and respectively output to the computer 230 the indicated sensed parameter signals SP1–SP9. In turn, the computer 230 responsively outputs the panel control signals PC1–PC9 and the system control signals SC1–SC9. The signals PC1–PC9 are utilized to control the various previously described illuminated displays on the control panel 210 (see FIG. 7), while the system control signals SC1–SC9 are routed to appropriate components in the particular air handling unit and its associated air purification system.

Using the unit 10 and its associated air purification system 12 shown in FIG. 2 as an example, the output signal SC1 is a sensed temperature signal and is routed to the HVAC unit 10 in the same manner as a conventional thermostat signal; output signal SC2 is a sensed humidity signal and is routed to the dehumidification coils 76 and the damper structures 38,66,68 as would the output signal of a conventional humidistat; and the output signals SC3–SC9 are sensed pollution level signals which are transmitted to the air purification system 12 and respectively correspond to the sensed pollution levels of particulate matter, carbon monoxide, carbon dioxide, ozone, sulfur dioxide, nitrogen dioxide and selected "other" pollutants as indicated on the face of the control panel 210 (see FIG. 7). As will be readily appreciated, the sensed parameter signals SP1–SP9 combinatively form the dashed line output signal 197 (FIGS. 2, 3, 5A, 5B and 6) from the multi-parameter sensing apparatus 100, while the system control output signals SC1–SC9 combinatively form the dashed line output signal 196 from the AQMC 30 to the particular air handling unit and its associated air purification system (FIGS. 2, 3, 5A, 5B and 6).

Figure 9:
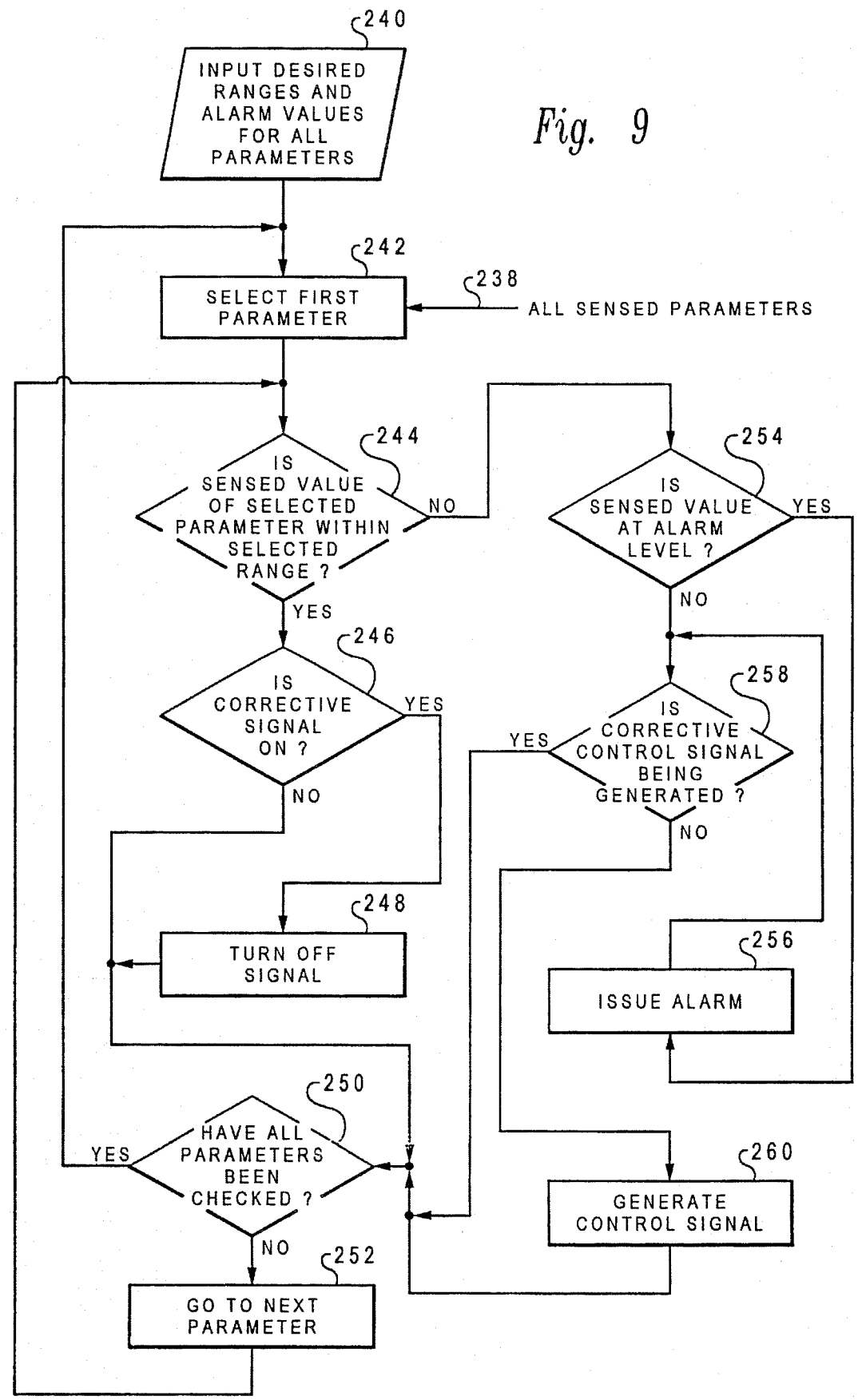
FIG. 9 is a flow chart illustrating the operation of a computer portion of the AQMC in monitoring and controlling the operating parameters of an air delivery and conditioning system into which the AQMC is representatively incorporated.

Turning now to the schematic flow diagram in FIG. 9, the monitoring and control operation of the computer 230 in generating the corrective system control signals SC1–SC9 will be briefly described. Basically, the computer 230 in the AQMC 30 continuously "polls" the various sensed parameters in a sequential fashion and responsively generates the corrective system control signals SC1–SC9 as needed to maintain the parameters within their predetermined ranges.

As schematically indicated by the input line 238 the computer 230 receives all of the sensed parameter signals SP1–SP9 from the parameter sensing apparatus 100 and, in step 240, also receives the user or manufacturer-established desired ranges and alarm values for all of the sensed parameters. At step 242 the computer then selects a first one of the inputted parameters and, in the next step 244, determines whether the selected parameter is within its desired range. If it is, the computer (at step 246) determines whether the associated corrective signal (SC) is being generated. If it is, the computer, at step 248, turns off the corrective signal and continues to step 250 in which the computer determines whether all of the parameters have been checked. If they have not, the computer executes the indexing step 252, selects the next parameter and returns to step 244. If all parameters have been checked, the computer starts the parameter polling process again, returning to step 242 as indicated.

Returning to step 244, if the computer determines in this step that the sensed value of the selected parameter is not within the selected range it executes step 254 and determines whether the sensed parameter value is at its predetermined alarm level. If it is, the alarm is issued via step 256 and, at step 258, the computer queries whether the corrective signal is being generated. If the corrective signal is not being generated, the computer generates it via step 260 and returns to step 250. If the corrective signal is being generated, the computer bypasses step 260 and returns directly to step 250 as indicated. In the foregoing manner, the computer 230 continuously monitors and adjusts the air handling unit and associated air purification system to which the AQMC 30 and multi-parameter sensing apparatus 100 are operatively coupled.

The foregoing detailed description is to be clearly understood as being given by way of illustration and example only, the spirit and scope of the present invention being limited solely by the appended claims.

What is claimed is:

1. An air handling unit comprising:

a housing having an inlet opening, an outlet opening, and an internal flow path extending between said inlet opening and said outlet opening;

blower means for sequentially flowing air inwardly through said inlet opening, through said internal flow path, and outwardly through said outlet opening;

air purification means, positioned in said internal flow path, for receiving pressurized liquid from a source thereof, creating a spray from the received liquid, using the spray to purify air traversing said internal flow path, and then permitting the sprayed liquid to drain therefrom;

sump means for holding a supply of liquid to be operatively supplied to said air purification means, and for receiving liquid draining from said air purification means;

filter means having therein a filtering flow path through which liquid may be forced to trap pollutants from the liquid, and a backwashing flow path through which liquid may be forced to cleanse said filter means of trapped pollutants;

a pump having an inlet communicatable with liquid in said sump means, and an outlet;

conduit means interconnecting said pump outlet with said filtering flow path and said backwashing flow path, and said filtering flow path with said air purification means, switching means coupled with said conduit means and being selectively operative in a first mode to cause sump liquid discharged from said pump to be forced through said filtering flow path to said air purification means, or in a second mode to cause sump liquid discharged from said pump to be forced through said backwashing flow path;

first monitoring means for detecting a change in an apparatus operating parameter, indicative of a predetermined lessening in the filtration efficiency of said filter means, and temporarily changing said switching means from said first mode thereof to said second mode thereof; and second monitoring means for detecting a change in selected environmental operating parameters and responsively controlling the operation of said air handling unit and said air purification means to maintain said selected environmental operating parameters within predetermined ranges therefor, said second monitoring means including:

multi-parameter sensing means for sensing the temperature, humidity, and level of at least one pollutant in air discharged from said air handling unit and responsively generating sensed parameter signals, and air quality monitor and controller means, interconnected between (1) said multi-parameter sensing means and (2) said air handling unit and said air purification means, for receiving said sensed parameter signals and responsively generating system output control signals operative to regulate the operation of said air handling unit and said air purification means.

2. The air handling unit of claim 1 wherein:

said air handling unit has means for operatively connecting it with a conditioned space, and said multi-parameter sensing means are operative to sense the temperature, humidity and level of at least one pollutant in the conditioned space external to said air handling unit.

3. The air handling unit of claim 1 wherein:

said multi-parameter sensing means are operative to sense the temperature, humidity and level of at least one pollutant in said internal flow path within said housing.

4. The air handling unit of claim 1 wherein said at least one pollutant is selected from the group consisting of particulate pollutants, carbon monoxide, carbon dioxide, ozone, sulfur dioxide, nitrogen dioxide, formaldehyde, hydrocarbons, fluorine, and hydrogen sulfide.

5. The air handling unit of claim 4 wherein said at least one pollutant includes a plurality of pollutants selected from said group.

6. The air handling unit of claim 5 wherein said at least one pollutant includes all of said pollutants in said group.

7. The air handling unit of claim 1 wherein:

said change in an apparatus operating parameter is an increase in the concentration of particulate pollutants in the sump liquid.

8. The air handling unit of claim 1 wherein:

said change in an apparatus operating parameter is an increase in the concentration of gaseous pollutants in the sump liquid.

9. The air handling unit of claim 1 wherein:

said first monitoring means are operative to sense an increase in pump back pressure and responsively change said switching means from said first mode to said second mode.

10. The air handling unit of claim 1 further comprising:

third monitoring means for detecting a change in an apparatus operating parameter and responsively injecting a quantity of chemical treatment additive into the sump liquid from a source thereof.

11. The air handling unit of claim 10 wherein:

said change in an apparatus operating parameter detected by said third monitoring means is an increase in chemically treatable pollutants in the sump liquid above a predetermined maximum level of chemically treatable pollutants therein.

12. The air handling unit of claim 10 wherein:

said change in an apparatus operating parameter is a decrease, below a predetermined level, of chemical treatment additive in the sump liquid.

13. The air handling unit of claim 12 wherein:

said third monitoring means are further operative to detect an increase in chemically treatable pollutants in the sump liquid above a predetermined maximum level of chemically treatable pollutants therein and responsively inject a quantity of chemical treatment additive into the sump liquid from a source thereof.

14. The air handling unit of claim 1 further comprising:

dehumidification means positioned in said internal flow path downstream from said air purification means and selectively operable to remove moisture from air exiting said air purification means.

15. The air handling unit of claim 14 wherein:

said dehumidification means include at least one cooling coil.

16. The air handling unit of claim 1 further comprising:

fill means for automatically maintaining a predetermined liquid level in said sump means.

17. The air handling unit of claim 1 wherein said air handling unit is a heating, ventilation and air conditioning unit.

18. The air handling unit of claim 1 wherein said air handling unit is an air purification and controlled humidification unit.

19. The air handling unit of claim 1 wherein:

said air quality monitor and controller means include means permitting a user thereof to preset therein desired, selectively variable ranges of temperature, humidity, particulate pollutants and gaseous pollutants in conditioned air discharged from said air handling unit, and means for generating system output control signals operative to regulate the operation of said air handling unit and said air purification means to achieve said selectively variable ranges of temperature, humidity, particulate pollutants, and gaseous pollutants in said conditioned air.

20. The air handling unit of claim 1 wherein:

said air quality monitor and controller means include means for permitting a user thereof to preset therein, desired, selectively variable alarm levels of temperature, humidity, particulate pollutants and gaseous pollutants in conditioned air discharged from said air handling unit, and means for generating an alarm signal if any of said alarm levels is reached during operation of said air handling unit.

21. The air handling unit of claim 1 wherein said air handling unit is an air purification and ventilation unit.

22. An air handling unit comprising:

a housing having an inlet opening, an outlet opening, and an internal flow path extending between said inlet opening and said outlet opening;

blower means for sequentially flowing air inwardly through said inlet opening, through said internal flow path, and outwardly through said outlet opening;

air purification means, positioned in said internal flow path, for receiving pressurized liquid from a source thereof, creating a spray from the received liquid, using the spray to purify air traversing said internal flow path, and then permitting the sprayed liquid to drain therefrom;

sump means for holding a supply of liquid to be operatively supplied to said air purification means, and for receiving liquid draining from said air purification means;

filter means having therein a filtering flow path through which liquid may be forced to trap pollutants from the liquid, and a backwashing flow path through which liquid may be forced to cleanse said filter means of trapped pollutants;

a pump having an inlet communicatable with liquid in said sump means, and an outlet;

conduit means interconnecting said pump outlet with said filtering flow path and said backwashing flow path, and said filtering flow path with said air purification means, switching means coupled with said conduit means and being selectively operative in a first mode to cause sump liquid discharged from said pump to be forced through said filtering flow path to said air purification means, or in a second mode to cause sump liquid discharged from said pump to be forced through said backwashing flow path;

first monitoring means for detecting a change in an apparatus operating parameter, indicative of a predetermined lessening in the filtration efficiency of said filter means, and temporarily changing said switching means from said first mode thereof to said second mode thereof; and second monitoring means for detecting a change in selected environmental operating parameters and responsively controlling the operation of said air handling unit and said air purification means to maintain said selected environmental operating parameters within predetermined ranges therefor, said second monitoring means including:

multi-parameter sensing means for sensing the level of at least one pollutant in air discharged from said air handling unit and responsively generating a sensed parameter signal, and air quality monitor and controller means, interconnected between (1) said multi-parameter sensing means and (2) said air handling unit and said air purification means, for receiving said sensed parameter signal and responsively generating system output control signals operative to regulate the operation of said air handling unit and said air purification means.

23. The air handling unit of claim 22 wherein said air handling unit has means for operating in an indoor environment.

24. The air handling unit of claim 22 wherein said air handling unit has means for operating in an outdoor environment.

25. The air handling unit of claim 22 wherein said at least one pollutant is selected from the group consisting of particulate pollutants, carbon monoxide, carbon dioxide, ozone, sulfur dioxide, nitrogen dioxide, formaldehyde, hydrocarbons, fluorine, and hydrogen sulfide.

26. The air handling unit of claim 25 wherein said at least one pollutant includes a plurality of pollutants selected from said group.

27. The air handling unit of claim 26 wherein said at least one pollutant includes all of said pollutants in said group.

* * * * *